Sept. 11, 1928.  W. E. HART  1,684,093
AUTOMOBILE BUMPER
Original Filed Oct. 7, 1927
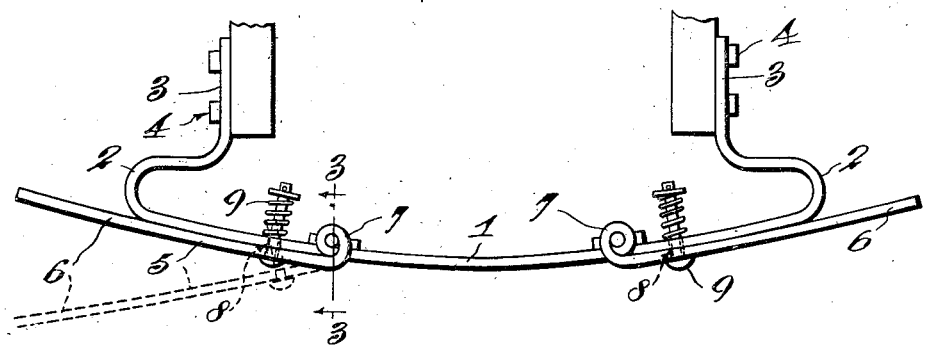
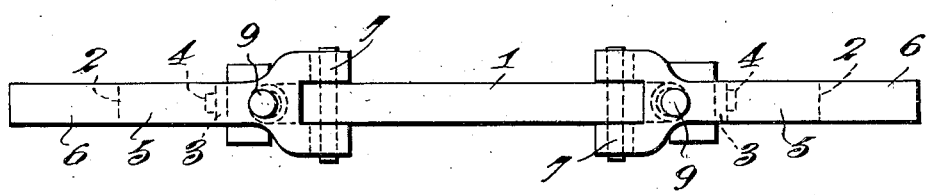
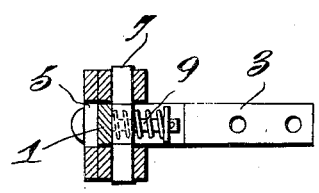
INVENTOR
*William E. Hart.*
BY
*Albert F. Dieterich*
ATTORNEY Patented Sept. 11, 1928.

1,684,093

UNITED STATES PATENT OFFICE.

WILLIAM E. HART, OF SAN JOSE, CALIFORNIA.

AUTOMOBILE BUMPER.

Original application filed October 7, 1927, Serial No. 224,662. Patent No. 1,670,963, dated May 22, 1928. Divided and this application filed March 24, 1928. Serial No. 264,383.

The invention generally relates to bumpers designed to protect vehicles against damage in collision, and more particularly to that type of such bumpers which provide for yieldably resisting obstructions when engaged in certain directions and to freely yield to obstructions engaged in other directions to prevent interlocking with said obstructions and breakage of said bumpers.

In its more detailed nature the invention resides in the provision of a novel bumper structure of the particular type stated which comprises a modification of the generic structure in my Patent No. 1,670,963, granted May 22, 1928 on an application filed October 7, 1927, Serial No. 224,662, of which application the present application is a division.

With the above and other objects in view, the invention further resides in the novel details of construction, combination and arrangement of parts, all of which will be first fully described in the following detailed description, then be particularly pointed out in the appended claims, reference being had to the accompanying drawing, in which:

Figure 1 is a plan view of the bumper.
Figure 2 is a face view.
Figure 3 is a vertical cross section taken on the line 3—3 on Figure 1.

In carrying out the invention I provide a main bar 1 which is curved to provide resilient ends 2 and mounting arms 3 adapted to be secured as at 4 to the chassis of the automobile on which the bumper is to be mounted.

Yieldable bumper members 5 are provided and are adapted to lie along a considerable portion at each end of the bumper bar 1 and extend from each end thereof as at 6. The yieldable bumper members 5 are pivoted at their ends as at 7 to the main bumper bar 1 at points a considerable distance inwardly of the extreme end of the said main bumper bar.

The members 5 and the bar 1 are provided with registering apertures 8 to receive the spring bolt equipments 9 which serve to yieldably hold the bumper members 5 to their normal position illustrated in full lines in Figure 1.

In use, the extending ends 6 are effective as though rigidly secured to the bar 1 against shocks directed toward the end of the automobile upon which they are mounted but are yieldable against obstructions from the opposite direction in the manner indicated in dotted lines in the said Figure 1.

By shaping the main bumper bar 1 as indicated in Figure 1, the bar is quite resilient and capable of efficiently absorbing shocks due to collision, and by providing the pivotal points 7 a considerable distance inwardly from the ends of the main bumper bar, the major portions of the yieldable bumper members 5 lie flatly against the said main bumper bar and shocks delivered directly to the extended ends of the said members are distributed to the main bumper and tendency to shear the pivots 7 is thus reduced to the minimum.

What I claim is:

1. In bumpers, a transverse resilient bar bent at its ends to form resilient end loops and mounting arms adapted to be secured to suitable supports, a yieldable bumper extending laterally beyond each end loop and pivoted to the transverse bar inwardly of the loop, and spring connections to hold each yieldable bumper member against the transverse bar to cooperate therewith in absorbing shocks in certain directions but permitting said yieldable bumper members to yield and move away from the transverse bar when engaged in other directions.

2. In bumpers, a transverse resilient bar bent at its ends to form resilient end loops and mounting arms adapted to be secured to suitable supports, a yieldable bumper extending laterally beyond each end loop and pivoted to the transverse bar inwardly of the loop, the said bar and bumpers having a set of registering apertures beyond each bumper pivot in the direction of projection of said bumpers, a bolt loosely mounted in each set of apertures and having abutments thereon, and coil springs interposed between certain of the abutments and the bar for the purpose specified.

3. In bumpers, a transverse resilient bar bent at its ends to form resilient end loops and mounting arms adapted to be secured to suitable supports, a yieldable bumper extending laterally beyond each end loop and pivoted to the transverse bar inwardly of the loop, the said bar and bumpers having a set of registering apertures beyond each bumper pivot in the direction of projection of said bumpers, a bolt loosely mounted in each set of apertures and having abutments thereon, coil springs interposed between certain of the abutments and the bar, said sets of apertures being positioned adjacent the respective bumper pivots, and said bumper pivots being positioned a considerable distance inwardly of the end loops whereby to provide for support of the bumpers by the bar through the major portion of their length.

WILLIAM E. HART.